Feb. 5, 1935. R. C. LASSIAT 1,989,934
TEMPERATURE REGULATION OF CATALYTIC CONVERTERS
Filed April 27, 1933 2 Sheets-Sheet 1
Fig. 1
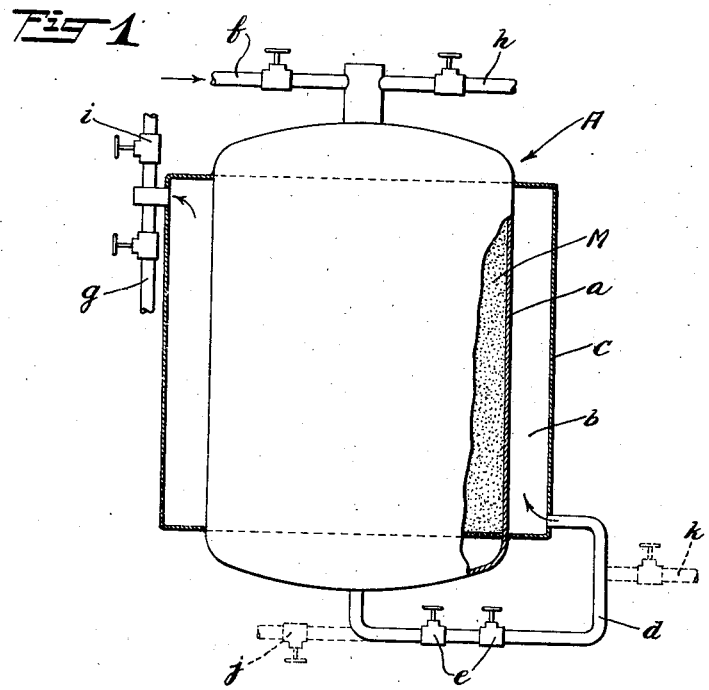
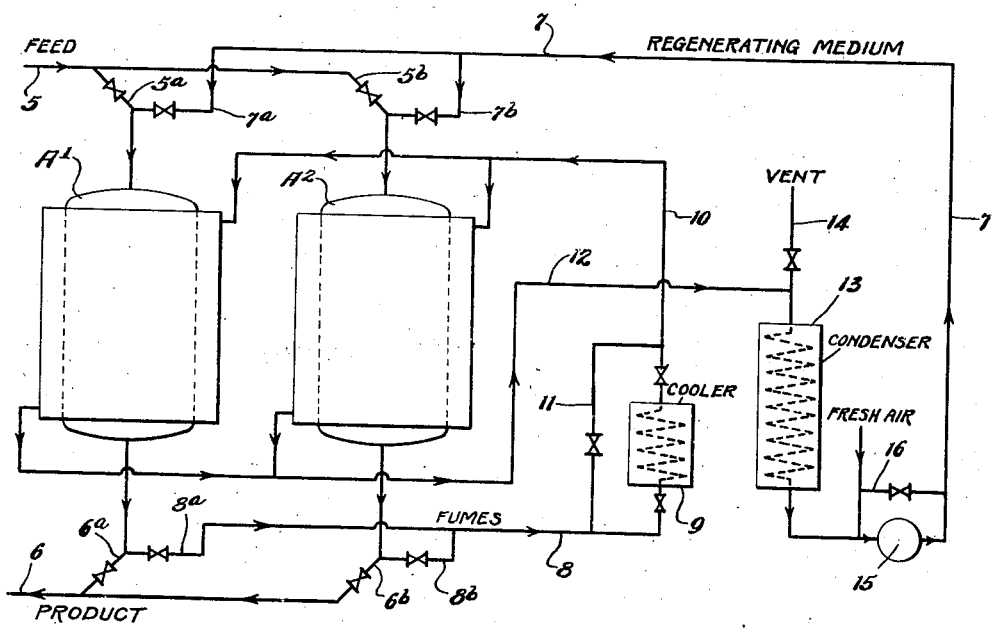
Fig. 2
INVENTOR
Raymond C. Lassiat.
BY
Ira L. Nickerson
ATTORNEY

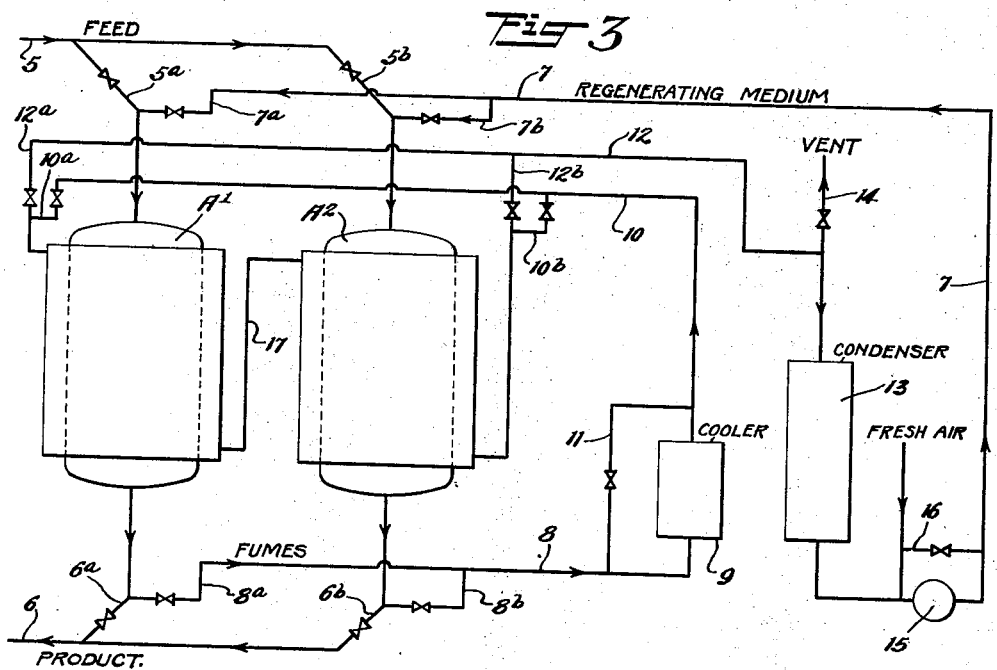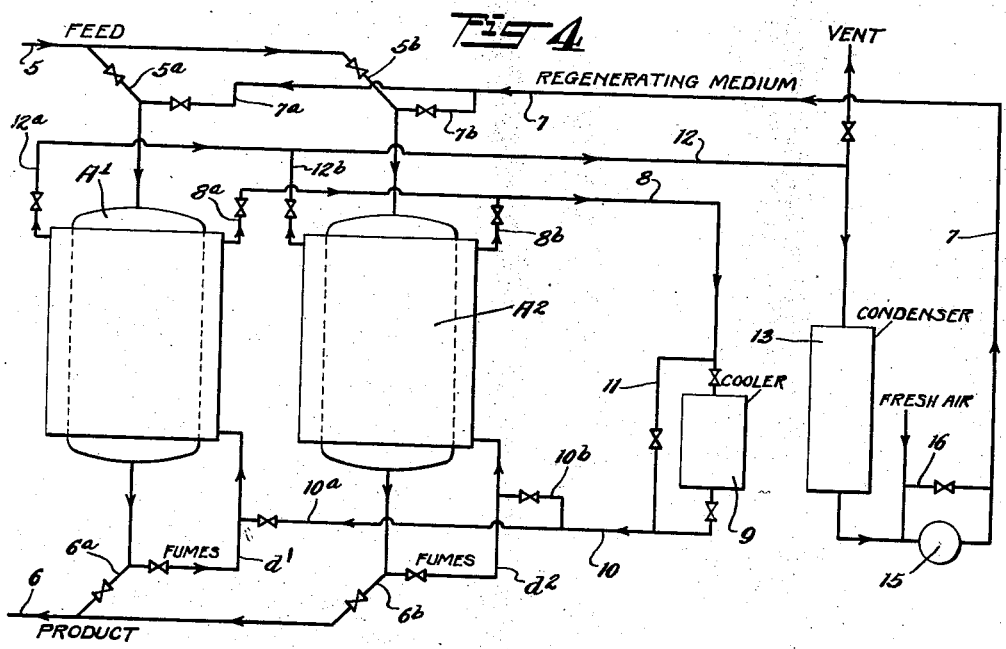

UNITED STATES PATENT OFFICE 1,989,934

TEMPERATURE REGULATION OF CATALYTIC CONVERTERS

Raymond C. Lassiat, Woodbury, N. J., assignor to Houdry Process Corporation, Dover, Del., a corporation of Delaware Application April 27, 1933, Serial No. 668,208

14 Claims. (Cl. 196—52)

This invention relates to converters utilizing contact masses for effecting chemical reactions. More particularly, it has to do with the regulation or control of temperature so that the reaction may take place throughout the entire contact mass. While not restricted thereto, this invention has a special application to apparatus utilizing two or more converters containing contact masses capable of regeneration in situ and arranged for continuous operation, each converter being alternately on stream and in regeneration.

One object of the invention is to avoid cold areas in that portion of the mass which contacts or is closely adjacent the converter wall. Another object is to minimize heat losses through the converter walls by supplying heat thereto. Another object is to devise practical ways of using the fumes of regeneration as the heating medium. Other objects will be apparent from the detailed description which follows.

The invention involves surrounding any desired part of a catalytic converter, such as the walls directly contacted by the catalytic mass, by an enclosure or envelope to form a space serving as a conduit for a heating medium. Suitable connections are made so that the heating medium may be a starting material or a product of the converter itself, or may come from an adjacent converter or any other source. The heating spaces of two or more adjacent converters may be connected to receive the heating medium in series or in parallel, with or without a preliminary cooling of the medium. Since the outer or heating chamber is independent of the catalytic chamber, different pressure conditions may exist therein through the use of suitable apparatus, which may be merely a reducing valve in the event that a connection is provided between the chambers.

In order to illustrate the invention, concrete embodiments thereof are indicated in the accompanying drawings, in which:

Fig. 1 is a side elevational view, partly in section and partly broken away, of a single converter; and Figs. 2, 3 and 4 are diagrammatic views illustrating various circuit arrangements involving the use of two converters.

Converter A provides a reaction chamber $a$ containing a contact mass M of any suitable type for carrying out the desired transformation or conversion of the starting material. The converter provides means for imparting heat to the outer wall of reaction chamber $a$ to counteract the normal heat losses by radiation, conduction and convection in order that the portion of the contact mass directly adjacent thereto may be maintained at the proper operating temperature. Such means may involve an outer and independent chamber $b$ formed by an outer shell $c$ spaced from and enclosing at least that portion of the converter A which corresponds to reaction chamber $a$. Any temperature controlling fluid may be circulated through chamber $b$ under the same or a different pressure from that obtaining in reaction chamber $a$. If this fluid medium comes from reaction chamber $a$, or is directed thereinto from outer chamber $b$, as by connection $d$, the pressure differential may be maintained by one or more pressure reducing valves $e$.

The starting material or fresh feed may enter the top of the converter A through a connection $f$, pass through reaction chamber $a$ where it undergoes conversion, and issue from the bottom of converter $a$ by connection $d$, where its pressure may be reduced by proper setting of valves $e$ before the fluid is discharged into outer chamber $b$, where it is circulated over and around the wall of reaction chamber $a$ to issue through an outlet connection $g$. In a similar manner, after an operative run is completed, regenerating fluid may enter through a connection $h$, pass through reaction chamber $a$, out through connection $d$ into chamber $b$, and escape through an outlet connection $i$. In the event that it is undesirable to send the products of one or both of the reactions taking place in chamber $a$ through outer chamber $b$, pressure reducing valves $e$ may be closed and the products diverted through a connection $j$, indicated in broken lines. In such a case, temperature regulating fluid for chamber $b$ may be supplied from any other source through a connection $k$, also shown in broken lines. It is to be further understood that any known or suitable apparatus may be utilized to distribute the reaction fluids in and throughout contact mass M, but since such apparatus forms no part of the present invention, illustration thereof has been omitted to make the drawings as simple and clear as possible. Conservation of heat may also be effected by covering or enclosing the converter with heat insulating material.

While there are instances in which a single double shelled converter may be used after the manner indicated in Fig. 1, the more general use is in connection with installations intended for continuous operation through utilizing two or more converters which are alternately on stream and in regeneration. The hot fumes of regeneration of each of the converters in turn may then be utilized to control the temperature of the outer walls of all the reaction chambers. Typical circuit arrangements are disclosed in Figs. 2, 3 and 4, in which two double shelled converters A', A², are shown, conforming substantially to converter A of Fig. 1, the connection d of the latter being omitted, however, in Figs. 2 and 3.

A feed line 5 has valved connections 5a and 5b extending to the tops of both converters A' and A², and valved connections 6a and 6b extending from the bottoms of the converters to a product line 6. A line 7 for a regenerating medium has valved connections 7a and 7b also extending to the upper ends of the converters, and valved connections 8a and 8b connect with a line 8 which conducts the fumes to a partial or preliminary cooler 9, from which the somewhat cooled fumes are conducted by a line 10 to the outer chambers of the double shelled converters. The temperature of the fumes in line 10 may be accurately regulated by a valved by-pass 11 around cooler 9. After circulating about the outer walls of the reaction chambers to modify the temperature thereof, the fumes pass by a line 12 to a condenser 13, where substantially all of the heat is extracted, excess fumes being discharged to atmosphere through a valved connection 14. The cooled fumes pass to the inlet of a pump 15, which discharges into feed line 7 of the regenerating medium, fresh air in a desired regulated amount being added to the cooled fumes through a combined inlet and valved controlled by-pass 16. In the arrangement shown in Fig. 2, all of the fumes from the converter in regeneration (which will be A' and A² in alternation) pass through or partly through preliminary cooler 9, and thence in parallel through the outer chambers of both converter A' and A².

In Fig. 3, there is a preliminary cooling of the fumes, as in Fig. 2, but, in this instance, the fumes pass to the outer chambers of the two converters in series. For example, if converter A² is in regeneration, the partly cooled fumes pass from line 10 through a valved connection 10b to the bottom of the independent chamber for converter A², and then pass from the top of the latter by a connection 17 to the bottom of the outer chamber of converter A', escaping from the top of the latter through a valved connection 12a into line 12. When converter A' is in regeneration, the controls will be so set that the partly cooled fumes will pass from line 10 by valved connection 10a into the top of the outer chamber of converter A' from the bottom of the latter through connection 17 to the top of the outer chamber of converter A², and from the bottom of the latter, through valved connection 12b to line 12.

In Fig. 4, connections d' and d² are provided for converters A' and A², similar to connection d of converter A of Fig. 1, and provision is made for directing fumes from the converter under regeneration without preliminary cooling through the outer chamber of such converter before discharging the same into fume line 8 leading to cooler 9. The fumes issuing from the latter are then sent only through the outer chamber of the converter on stream. For example, if we assume, in Fig. 4, that converter A² is in regeneration, the valved controls will be set in such a way that the fumes issuing from this converter pass through connection d² into the lower end of its outer chamber, to be discharged from the top of the latter by a valved connection 8b into line 8. The fumes pass through preliminary cooler 9, line 10 and valved connection 10a into connection d', and thence into the bottom of the outer chamber of converter A', the fumes then issuing from the top of the latter into valved connection 12a leading into line 12. When converter A' is in regeneration, the fumes will be discharged through valved connection d' into the bottom of its outer chamber, to issue through valved connection 8a into line 8. After traversing cooler 9, the cooled fumes will pass through line 10 and valved connection 10b into connection d², which leads into the bottom of the outer chamber of converter A², whence the fumes are discharged by valved connection 12b into line 12.

From the above, it will be apparent that the present invention provides for accurate control of the wall temperature of a reaction chamber, thereby to avoid undue heating or cooling of that portion of the contact mass which is directly against the walls of the chamber, that in a continuously operating system using two or more converters, the hot fumes of regeneration of each converter in turn may be utilized for heat control of the walls of the reaction chambers of all of the converters, and that the fumes may be directed to the outer chambers of converters having double shells either in series or in parallel and with or without preliminary cooling. The invention has an important application to the catalytic treatment of hydrocarbons, as in the transforming of higher boiling hydrocarbons into lower boiling hydrocarbons, and in the refining of low boiling hydrocarbons. In the transforming of a high boiling hydrocarbon into gasoline, by the use of catalytic material such as an activated silicate of alumina in molded pieces for regeneration in situ, the transforming temperature may range from 750° to 900° F., while the temperature of regeneration by oxidation may range from 800° to 1150° F. If the fumes issue from the converter in regeneration at 1100° F., they may have a preliminary cooling to about 850° F. in cooler 9 before admission to the outer chambers of the converters, as indicated in Figs. 2 and 3. This temperature is about right for the contact mass which is on stream and is also proper at the start of regeneration for the contact mass which is in contact with the outer wall of its reaction chamber. Also, as in Fig. 4, the fumes at 1100° F. may be discharged directly into the outer chamber of the converter undergoing regeneration to hold the entire mass at about that temperature before undergoing a preliminary cooling in cooler 9 to the required temperature for the on stream operation in the other converter.

While the invention has been herein disclosed in certain preferred forms, it is to be understood that the invention is not restricted to the specific details thereof, but covers all changes, adaptations and modifications within the scope of the appended claims.

I claim as my invention:

1. In the temperature regulation of chemical reactions involving the catalytic cracking of hydrocarbons through the use of a catalytic converter having a reaction chamber containing a contact mass in which an on stream or endothermic reaction alternates with an exothermic reaction involving regeneration of the mass by oxidation so that the wall of the chamber is at varying temperatures due to the endothermic and exothermic reactions taking place therein, the operating process which comprises passing a heated medium constantly and at a substantially constant temperature in heat exchange relation with the wall of said chamber without regard to whether the reaction taking place at any given time is endothermic or exothermic.

2. In the temperature regulation of chemical reactions involving the catalytic cracking of hydrocarbons through the use of a catalytic converter having a reaction chamber containing a contact mass in which an on stream or endothermic reaction below 900° F. alternates with an exothermic reaction above 800° F. involving regeneration of the mass by oxidation so that the wall of the chamber is at varying temperatures due to the endothermic and exothermic reactions taking place therein, the operating process which comprises continuously passing over the wall of said chamber a fluid at a constant temperature intermediate said reaction temperatures.

3. In the temperature regulation of chemical reactions involving the use of two or more converters each providing a reaction chamber containing a contact mass, the converters being arranged for continuous operation alterately on stream in an endothermic reaction and in regeneration by oxidation, the operating process which comprises passing the fluid products from the converter in regeneration at a temperature intermediate the on stream and the regenerating temperatures in parallel over the walls of all the reaction chambers.

4. In the temperature regulation of chemical reactions involving the use of two or more converters each providing a reaction chamber containing a contact mass, the converters being alternately on stream in endothermic reaction and in regeneration by oxidation, the operating process which comprises modifying the temperature of the fumes issuing from the reaction chamber in regeneration, and then passing said fumes in series in heat exchange relation with the outer walls of all of the reaction chambers.

5. In the temperature regulation of chemical reactions involving the use of two or more converters each providing a reaction chamber containing a contact mass, the converters being arranged for operation alternately on stream and in regeneration by oxidation, the operating process which comprises reducing the temperature of the fumes issuing from the reaction chamber in regeneration to a temperature somewhat above that for on stream operation, and then passing said fumes in parallel over the wall of the reaction chamber on stream to impart heat thereto and over the wall of the chamber in regeneration to remove heat therefrom.

6. In the temperature regulation of chemical reactions involving the use of two or more converters each providing a reaction chamber containing a contact mass, the converters being arranged for operation alternately on stream and in regeneration by oxidation, the operating process which comprises reducing the temperature of the fumes issuing from the reaction chamber in regeneration to a temperature somewhat above that for on stream operation, then passing said fumes in parallel over the wall of the reaction chamber on stream to impart heat thereto and over the wall of the chamber in regeneration to remove heat therefrom, further cooling said fumes, and then returning some or all of said fumes admixed with fresh air to the reaction chamber in regeneration.

7. In the temperature regulation of chemical reactions involving the use of two or more converters each providing a reaction chamber containing a contact mass, the converters being arranged for operation alternately on stream and in regeneration by oxidation, the operating process which comprises passing the fumes from the reaction chamber in regeneration over the wall of the latter, then reducing the temperature of said fumes and passing them over the wall of the reaction chamber on stream, then cooling said fumes and returning them admixed with air to the reaction chamber in regeneration.

8. Apparatus for effecting chemical reactions comprising at least two converters, each containing a contact mass, connections and controls for operating said converters alternately on stream and in regeneration by oxidation, means on the exterior of each of said converters forming a chamber independent of the reaction chamber but enclosing at least a portion of the latter, and connecting means between said chambers whereby the hot fumes from each of said converters when in regeneration may be conducted in series through its own independent chamber and thence through the independent chamber of the converter then on stream.

9. Apparatus for effecting chemical reactions comprising a plurality of double shelled converters, each converter having a reaction chamber containing a contact mass and an independent chamber for imparting heat to or conducting heat from the walls of the reaction chamber, connections and controls for operating said converters alternately on stream and in regeneration by oxidation, and means for directing fumes from each of said reaction chambers when in regeneration at different temperatures into and through all said independent chambers in series.

10. Apparatus for effecting chemical reactions comprising a plurality of double shelled converters, each converter having a reaction chamber containing a contact mass and an independent chamber for imparting heat to or conducting heat from the walls of the reaction chamber, connections and controls for operating said converters alternately on stream and in regeneration by oxidation, and means for directing fumes from each of said reaction chambers when in regeneration into both and through all said independent chambers in parallel and back again into said reaction chamber whence they issued.

11. Apparatus for effecting chemical reactions comprising two double shelled converters, each converter having a reaction chamber containing a contact mass and an independent chamber for imparting heat to or conducting heat from the walls of the reaction chamber, connections and controls for operating said converters alternately on stream and in regeneration by oxidation, means for directing fumes from each of said reaction chambers when in regeneration into both said independent chambers and back again into said reaction chamber whence they issued, and means for modifying the heat content of said fumes just prior to their return to said last named chamber.

12. Apparatus for effecting chemical reactions comprising a plurality of double shelled converters, each converter having a reaction chamber containing a contact mass and an independent chamber for imparting heat to or conducting heat from the walls of the reaction chamber, connections and controls for operating said converters alternately on stream and in regeneration by oxidation, means for directing fumes from each of said reaction chambers when in regeneration into said independent chambers in parallel and back again into said reaction chamber whence they issued, and means for modifying the heat content of said fumes before and after passing through said independent chambers.

13. Apparatus for effecting chemical reactions comprising at least two double shelled converters, each converter having a reaction chamber containing a contact mass capable of regeneration by oxidation in situ and an independent chamber surrounding at least in part said reaction chamber for imparting heat to or conducting heat from the walls of the reaction chamber, means conducting the hot fumes of regeneration from one converter through the independent chamber of the latter and then through the independent chamber of the other converter, and means for extracting heat from said fumes both before and after passing the said independent chamber of said other converter, and for returning at least a part of the cooled fumes together with oxygen or an oxygen containing medium back to said reaction chamber whence they originated in order to continue the regenerating operation.

14. Apparatus for effecting chemical reactions comprising at least two converters designed for continuous operation, each converter having a reaction chamber containing a contact mass, connections and controls for operating said converters alternately on stream and in regeneration by oxidation, means circulating the hot fumes of regeneration over and around the outer walls of the reaction chambers of all of said converters, and means sending at least a part of the fumes together with an oxygen containing gas back into the reaction chamber whence the said fumes issued.

RAYMOND C. LASSIAT.

CERTIFICATE OF CORRECTION.

Patent No. 1,989,934.                                     February 5, 1935.

RAYMOND C. LASSIAT.

It is hereby certified that error appears in the printed specification of the above numbered patent requiring correction as follows: Page 3, first column, line 23, claim 3, for "alterately" read alternately; and second column, line 47, claim 10, strike out the word "both"; and that the said Letters Patent should be read with these corrections therein that the same may conform to the record of the case in the Patent Office.

Signed and sealed this 12th day of March, A. D. 1935.

Leslie Frazer
Acting Commissioner of Patents.

(Seal)